United States Patent [19]

Iwakiri et al.

[11] Patent Number: 5,286,780
[45] Date of Patent: Feb. 15, 1994

[54] CURABLE COMPOSITION

[75] Inventors: Hiroshi Iwakiri; Masayuki Fujita; Takashi Hasegawa, all of Hyogo, Japan

[73] Assignee: Kanegafuchi Kagaku Kogyo Kabushiki Kaisha, Osaka, Japan

[21] Appl. No.: 941,804

[22] Filed: Sep. 8, 1992

[30] Foreign Application Priority Data

Sep. 9, 1991 [JP] Japan ................................. 3-228104

[51] Int. Cl.$^5$ ..................... C08G 65/32; C08L 71/02; C08L 83/10
[52] U.S. Cl. .................................. 524/500; 525/403; 525/409; 528/25
[58] Field of Search ...................... 525/409, 403, 100; 528/25, 33; 524/500

[56] References Cited

U.S. PATENT DOCUMENTS 4,906,707  3/1990  Yukimoto et al. .................. 525/403

FOREIGN PATENT DOCUMENTS 0116309  8/1984  European Pat. Off. .
0322857  7/1989  European Pat. Off. .
0397036  11/1990  European Pat. Off. .

OTHER PUBLICATIONS

Chemical Patents Index, Documentation Abstracts Journal, Sect. Ch, Week 9144, Jan. 8, 1992, AN 91-325188/44 & WO-A-9 115 536, Oct. 1991, Abstract.

*Primary Examiner*—Ralph H. Dean
*Attorney, Agent, or Firm*—Armstrong, Westerman, Hattori, McLeland & Naughton

[57] ABSTRACT

A curable composition is disclosed, including (A) an oxypropylene polymer having a narrow molecular weight distribution which does not have any branched chain, is linear and has at least one reactive silicon atom-containing group; and (B) an oxypropylene polymer having a narrow molecular weight distribution which has at least one branched chain and at least one reactive silicon atom-containing group. Cured articles obtained from the curable composition have a tear strength which is unexpectedly higher than the tear strength of the cured article of the component (A) alone or the component (B) alone.

9 Claims, No Drawings

CURABLE COMPOSITION

FIELD OF THE INVENTION

This invention relates to a novel curable composition comprising oxypropylene polymers having a reactive silicon group(s) (a silicon atom-containing group having one or more silicon atoms to which one or more hydroxyl groups or hydrolyzable groups are attached, i.e., a group capable of forming siloxane bond; the same applies hereinbelow).

BACKGROUND OF THE INVENTION

Oxypropylene polymers having a reactive silicon group(s) are polymers which are capable of becoming liquid polymers and are cured in the presence of moisture at room temperature to form rubbery elastic cured articles. Accordingly, these polymers are used in the fields of elastic sealants and adhesives for architectural structures.

It is desirable that these polymers have an appropriate viscosity when blended or applied. Further, it is desirable that these polymers have a given molecular weight to provide cured articles having desired mechanical characteristics, particularly rubber elasticity high in flexibility.

Many methods for preparing organic polymers having reactive silicon groups in the molecule have been proposed. For example, organic polymers (trade mark: MS polymer) having a main chain composed of an oxypropylene polymer and methoxysilyl groups at terminals are manufactured by Kanegafuchi Kagaku Kogyo K.K. and are commercially available.

However, there is conventionally a difficulty in manufacturing oxypropylene polymers having a narrow molecular weight distribution (Mw/Mn ratio measured by GPC is small) and a high molecular weight. Accordingly, only polymers having a wide molecular weight distribution (Mw/Mn measured by GPC is large) including oxypropylene polymers having reactive silicon groups have been conventionally used.

It has recently been reported that an oxypropylene polymer having a narrow molecular weight distribution has been obtained. Polymers having a main chain composed of an oxypropylene polymer having a narrow molecular weight distribution and reactive silicon groups, as terminal groups, introduced into the terminals of the polymer chain, have a low viscosity before curing.

The present inventors have found that a composition comprising a mixture of a linear polymer having no branched chain and a polymer having at least one branched chain in a curable composition comprising oxypropylene polymers having a narrow molecular weight distribution gives a cured article having a greatly improved tear strength which is unexpectedly higher than that which can be estimated from tear strength of cured articles of each the polymers. The present invention has been accomplished on the basis of this finding.

SUMMARY OF THE INVENTION

An object of the present invention is to provide a novel curable composition comprising oxypropylene polymers.

Another object of the present invention is to provide a curable composition which gives a cured article having an excellent tear strength.

The present invention provides a curable composition comprising (A) an oxypropylene polymer (1) which has a ratio of Mw/Mn [a ratio of weight-average molecular weight (Mw) to number-average molecular weight (Mn)] of not higher than 1.6; (2) which has a polymer main chain consisting essentially of a repeating unit represented by the following formula;

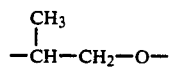

(3) which does not have any branched chain; and (4) which has at least one silicon atom-containing group having one or more silicon atoms to which one or more hydrolyzable groups are attached; and (B) an oxypropylene polymer (1) which has a ratio of Mw/Mn of not higher than 1.6; (2) which has a polymer main chain consisting essentially of a repeating unit represented by the following formula;

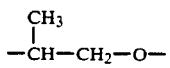

(3) which has at least one branched chain; and (4) which has at least one silicon atom-containing group having one or more silicon atoms to which one or more hydrolyzable groups are attached.

DETAILED DESCRIPTION OF THE INVENTION

Now, the present invention will be illustrated in more detail below.

Typical reactive silicon groups which can be used in the present invention include, but are not limited to, the following groups represented by the following general formula

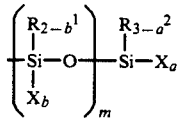

wherein $R^1$ and $R^2$ each represents an alkyl group having 1 to 20 carbon atoms, an aryl group having 6 to 20 carbon atoms, an aralkyl group having 7 to 20 carbon atoms or a triorganosiloxy group represented by the formula $(R')_3SiO-$ provided that when two or more $R^1$ or $R^2$ groups exist, these two or more $R^1$ or $R^2$ groups may be the same or different; R' represents a monovalent hydrocarbon group having 1 to 20 carbon atoms and three R' groups may be the same or different; X represents a hydroxyl group or a hydrolyzable group and when two or more X groups exists, such two or more X groups may be the same or different; a represents 0, 1, 2 or 3; b represents 0, 1 or 2 and when two or more groups represented by the following formula

exist, b in the above formula may be the same or different; and m represents an integer of 0 to 19 provided that the following relationship must be satisfied.

$$a + \Sigma b \geq 1$$

Any of conventional hydrolyzable groups can be used as the hydrolyzable group represented by X. Examples of such hydrolyzable groups include a hydrogen atom, a halogen atom, an alkoxy group, an acyloxy group, a ketoxymate group, an amino group, an amido group, an acid amido group, an aminoxy group, a mercapto group and an alkenyloxy group. Among these groups, a hydrogen atom, an alkoxy group, an acyloxy group, a ketoxymate group, an amino group, an amido group, an aminoxy group, a mercapto group and an alkenyloxy group are preferred. Particularly preferred is an alkoxy group such as a methoxy group because of its mild hydrolyzability and easy handleability.

One, two or three hydrolyzable groups or hydroxyl groups can be attached to one silicon atom, and $(a + \Sigma b)$ is preferably 1 to 5. When two or more hydrolyzable groups or hydroxyl groups are present in the reactive silicon group, they may be the same or different.

The reactive silicon group may have only one silicon atom or two or more silicon atoms. However, in the case of a reactive silicon group where silicon atoms are bonded to each other through siloxane bonds, the group may have about 20 silicon atoms.

Preferred for the purpose of the present invention are reactive silicon groups represented by the following general formula because of their ready availability

wherein $R^2$, X and a are as defined above.

Examples of $R^1$ and $R^2$ in the above formula include an alkyl group such as methyl group or ethyl group, a cycloalkyl group such as cyclohexyl group, an aryl group such as phenyl group, an aralkyl group such as benzyl group and a triorganosiloxy group of $(R')_3SiO-$ wherein $R'$ is a methyl group or a phenyl group. $R^1$, $R^2$ and $R'$ are particularly preferably a methyl group.

One molecule of the oxypropylene polymer has at least one, preferably 1.1 to 5 reactive silicon groups. When the number of the reactive silicon groups to be present in one molecule of the polymer is less than one, curability is insufficient and there is a difficulty in obtaining good rubbery elastic behavior.

The reactive silicon groups may be present at the terminal positions of the molecular chain of the oxypropylene polymer, or the polymer chain may be interrupted by the reactive silicon groups. When the reactive silicon groups are present at the terminal positions of the polymer chain, a rubbery cured article having a high strength, a high elongation and a low modulus can be easily obtained because the amount of the effective network structure of the oxypropylene polymer component to be finally contained in the cured article is increased.

The oxypropylene polymer in each of the components (A) and (B) has a polymer main chain comprising a repeating unit represented by the following formula.

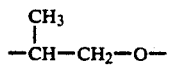

The oxypropylene polymers may have other monomer units. However, it is preferred that at least 50% by weight, more preferably at least 80% by weight of monomer units in the polymer is composed of the monomer unit which forms the polymer main chain comprising the above-described repeating unit.

It is preferred that the oxypropylene polymers having the reactive silicon group(s) which are the components (A) and (B) of the present invention are prepared by introducing reactive silicon group(s) into an oxypropylene polymer having functional groups.

It is very difficult to prepare oxypropylene polymers having a high molecular weight, a narrow molecular weight distribution and functional groups by conventional polymerization methods for oxypropylene or chain-lengthening methods using an oxypropylene polymer as a starting material. However, oxypropylene polymers having a high molecular weight, a narrow molecular weight distribution and functional groups can be obtained by specific polymerization methods described in JP-A-61-197631 (the term "JP-A" as used herein means an "unexamined published Japanese patent application"), JP-A-61-215622, JP-A-61-215623, JP-A-61-218632, JP-B-46-27250 (the term "JP-B" as used herein means an "examined Japanese patent publication") and JP-B-59-15336. It is preferred that the molecular weight distribution before the introduction of the reactive silicon group(s) is as narrow as possible because, when the reactive silicon groups is introduced into the polymer, the molecular weight distribution is apt to be widened in comparison with the molecular weight distribution of the polymer before the introduction of the reactive silicon group(s).

The introduction of the reactive silicon group(s) into the polymer can be made by conventional methods. Examples of such methods include the following methods.

(1) An oxypropylene polymer having functional groups such as hydroxy groups at the chain terminal positions thereof is reacted with an organic compound having an unsaturated group and an active group reactive with the functional groups, and the resulting reaction product is reacted with a hydrosilane having a hydrolyzable group by hydrosilylation.

(2) An oxypropylene polymer having functional groups (hereinafter referred to as Y functional group) such as hydroxyl groups, epoxy groups or isocyanate groups at the chain terminal positions thereof is reacted with a compound having a reactive silicon group(s) and a functional group (hereinafter referred to as Y' functional group) reactive with the Y functional group.

Examples of the compound having a Y' functional group and a reactive silicon group(s) include, but are not limited to, amino group-containing silanes such as γ-(2-aminoethyl)aminopropyltrimethoxysilane, γ-(2-aminoethyl)aminopropylmethyldimethoxysilane and γ-aminopropyltriethoxysilane; mercapto group-containing silanes such as γ-mercaptopropyltrimethoxysilane and γ-mercaptopropylmethyldimethoxysilane; epoxy silanes such as γ-glycidoxypropyltrimethoxysilane and β-(3,4-epoxycyclohexyl)ethyltrimethoxysilane; vinyl type unsaturated group-containing silanes such as vinyltriethoxysilane, γ-methacryloyloxypropyltrimethoxysilane and γ-acryloyloxypropylmethyldimethoxysilane; chlorine atom-containing silanes such as γ-chloropropyltrimethoxysilane; isocyanate group-containing silanes such as γ-isocyanatopropyltriethoxysilane and γ-isocyanatopropylmethyldimethoxysilane; and hydrosilanes such as methyldimethoxysilanes, trimethoxysilane and methyldiethoxysilane.

In the above-described methods, there is preferred the method (1) or the method (2) wherein a polymer having hydroxyl groups at the terminals thereof is reacted with a compound having an isocyanate group and a reactive silicon group(s).

The reactive silicon group-containing oxypropylene polymer used as the component (A) is a linear polymer. An example of a method for obtaining the polymer includes, but is not limited to, a method wherein a reactive silicon group(s) is introduced into both terminal hydroxyl groups of polyoxypropylene glycol (PPG) obtained by conventional method.

The reactive silicon group-containing oxypropylene polymer used as the component (B) has at least one branched chain. An example of a method for obtaining the polymer includes, but is not limited to, a method wherein a reactive silicon group(s) is introduced into three terminal hydroxyl groups of polyoxypropylene triol (PPT) obtained by conventional method or into four or more functional groups of polypropylene oxide (PPO) having four or more functional groups.

Examples of methods for obtaining the curable composition of the present invention include a method wherein the reactive silicon group-containing PPG is mixed with the reactive silicon group-containing PPT, and a method wherein a reactive silicon group(s) is introduced into hydroxyl groups of a mixture of PPG and PPT.

The reactive silicon group-containing oxypropylene polymers used as the components (A) and (B) have a number-average molecular weight (Mn) of preferably not less than 4,000, more preferably not less than 8,000. When polymers having a higher Mn are used, the rubber elasticity of the resulting cured article can be improved. Polymers having different molecular weights may be used as the components (A) and (B), and a mixture thereof may be used.

The reactive silicon group-containing oxypropylene polymers used as the components (A) and (B) have a ratio of Mw/Mn of not higher than 1.6. Accordingly, the polymers have a narrow molecular weight distribution. The ratio of Mw/Mn is preferably not higher than 1.5, more preferably not higher than 1.4. The polymers having a high number-average molecular weight, but a narrow molecular weight distribution, have a low viscosity before curing and are easy to handle.

The molecular weight distribution can be measured by various methods, but it is generally measured by means of gel permeation chromatography (GPC).

Cured articles obtained from a curable composition comprising an oxypropylene polymer having at least one reactive silicon group as the component (A) and an oxypropylene polymer having at least one reactive silicon group as the component (B) have a tear strength which is higher than the value of tear strength which can be developed in the cured articles of the component (A) alone or the component (B) alone.

In general, when the tear properties of the cured articles of the oxypropylene polymer having at least one reactive silicon group as the component (A) alone are compared with those of the cured articles of the oxypropylene polymer having at least one reactive silicon group as the component (B) alone, the cured articles of the component (A) have a low modulus and high elongation, while the cured articles of the component (B) have a high modulus and low elongation. Accordingly, properties such as modulus and elongation can be easily controlled to a desired value in a given range by mixing the component (A) with the component (B) in an appropriate ratio.

Though there is no particular limitation with regard to the mixing ratio of the component (A) to the component (B), the mixing ratio, on a parts by weight basis, of the component (A) to the component (B) is preferably from 10:90 to 90:10, more preferably from 20:80 to 80:20.

The composition of the present invention can be cured without using any curing catalyst. However, the composition of the present invention may be cured in the presence of a curing catalyst. When the composition of the present invention is to be cured in the presence of a curing catalyst, any of conventional curing catalysts can be used. Examples of the curing catalysts which can be used in the present invention include titanates such as tetrabutyl titanate and tetrapropyl titanate; tin salts of carboxylic acids such as dibutyltin dilaurate, dibutyltin maleate, dibutyltin diacetate, tin octylate and tin naphthenate; reaction products of dibutyltin oxide with phthalic esters; dibutyltin diacetylacetonate; organoaluminum compounds such as aluminum trisacetylacetonate, aluminum trisethylacetoacetate and diisopropoxyaluminum ethylacetoacetate; chelate compounds such as zirconium tetraacetylacetonate and titanium tetraacetylacetonate; lead octylate; amine compounds such as butylamine, octylamine, laurylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)-phenol, morpholine, N-methylmorpholine, 2-ethyl-4-methylimidazole and 1,8-diazabicyclo(5.4.0)undecene-7 (DBU) and salts of these amine compounds with carboxylic acids; low-molecular polyamide resins obtained from an excess amount of a polyamine and a polybasic acid; reaction products obtained from an excess amount of a polyamine and an epoxy compound; silane coupling agents having amino group such as γ-aminopropyltrimethoxysilane and N-(β-aminoethyl)aminopropylmethyldimethoxysilane; and other conventional silanol condensation catalysts, acid catalysts and basic catalysts. These catalysts may be used either alone or in combination of two or more of them.

These curing catalysts are used in an amount of preferably 0.1 to 20 parts (by weight, the same applies hereinbelow), more preferably 1 to 10 parts based on 100 parts of the oxypropylene polymer having at least one reactive silicon group. When the amount of the curing catalyst to the oxypropylene polymer having at least one reactive silicon group is too small, the curing rate is retarded or the curing reaction proceeds insufficiently, while when the amount of the curing catalyst is too large, heat generation or foaming locally occurs during curing and there is a difficulty in obtaining good cured articles. Accordingly, the amount of the curing catalyst outside the range described above is not preferred.

The oxypropylene polymers having at least one reactive silicon group can be modified by mixing various fillers. Examples of the fillers include reinforcing fillers such as fumed silica, precipitated silica, silicic anhydride, hydrated silicic acid and carbon black; fillers such as calcium carbonate, magnesium carbonate, diatomaceous earth, calcined clay, clay, talc, titanium oxide, bentonite, organic bentonite, ferric oxide, zinc oxide, active zinc flower, hydrogenated castor oil and inorganic hollow microspheres (Shirasuballoon); and fibrous fillers such as asbestos, glass fiber and filament.

When the filler is used to obtain a cured composition having a high strength, a filler selected from the group consisting of fumed silica, precipitated silica, silicic anhydride, hydrated silicic acid, carbon black, surface-treated fine calcium carbonate, calcined clay, clay and active zinc flower is mainly used in an amount of 1 to 100 parts based on 100 parts of the oxypropylene polymer having at least one reactive silicon group, whereby a favorable effect can be obtained. When a cured composition having a low strength and high elongation is to be obtained, a filler selected from the group consisting of titanium oxide, calcium carbonate, magnesium carbonate, talc, ferric oxide, zinc oxide and inorganic hollow microspheres is mainly used in an amount of 5 to 200 parts based on 100 parts of the oxypropylene polymer having at least one reactive silicon group, whereby a favorable effect can be obtained. These fillers may be used either alone or as a mixture of two or more of them.

Plasticizers can be effectively used together with the fillers in the curable composition of the present invention because the elongation of the cured articles can be increased or a larger amount of the filler can be mixed. Examples of the plasticizers which can be used in the present invention include phthalic esters such as dioctyl phthalate, dibutyl phthalate and butyl benzyl phthalate; aliphatic dibasic acid esters such as dioctyl adipate, isodecyl succinate and dibutyl sebacate; glycol esters such as diethylene glycol dibenzoate and pentaerythritol ester; aliphatic esters such as butyl oleate and methyl acetyl ricinoleate; phosphoric esters such as tricresyl phosphate, trioctyl phosphate and octyl diphenyl phosphate; epoxy plasticizers such as epoxidized soybean oil and benzyl epoxystearate; polyester plasticizers such as polyesters derived from a dibasic acid and a dihydric alcohol; polyethers such as polypropylene glycol and derivatives thereof; polystyrene compounds such as poly-$\alpha$-methylstyrene and polystyrene; and other plasticizers such as polybutadiene, butadiene-acrylonitrile copolymer, polychloroprene, polyisoprene, polybutene and chlorinated paraffins. These plasticizers may be used either alone or as a mixture of two or more of them. The plasticizers are used in an amount of preferably 1 to 100 parts based on 100 parts of the oxypropylene polymer having at least one reactive silicon group.

The curable composition of the present invention can be prepared, for example, by a conventional method wherein the components are kneaded at room temperature or under heating by using a mixer, rollers or a kneader, or a method wherein the components are dissolved in a small amount of an appropriate solvent and mixed without particular limitation. One-pack type or two-pack type blend can be prepared by using an appropriate combination of the components.

When the curable composition of the present invention is exposed to the air, a three-dimensional network structure is formed by the action of water in air, whereby the composition is cured to form a solid having rubbery elasticity.

Various additives such as an adhesion improver, physical property adjustor, shelf stability improver, lubricant, pigment and blowing agent may be optionally added to the curable composition of the present invention when applied.

The curable composition of the present invention is particularly useful as an elastic sealant and can be used as a sealing medium for building structures, marine structures, automobiles and roads. The curable composition can be used alone or as various types of sealing compositions or binding compositions because the curable composition can be bonded to various substrates such as glass, porcelain, wood, metal and molded resin articles with the aid of primers. Further, the curable composition of the present invention is useful as food packaging materials, casting rubber materials, templating materials and coating materials.

Cured articles obtained from the curable composition of the present invention have excellent tear strength.

The invention will be better understood with reference to the following examples. It is understood, however, that the examples are intended for illustration only and it is not intended that the invention be limited thereby.

SYNTHESIS EXAMPLE 1

Into a 1.5 l pressure glass reactor was charged 401 g (0.081 equivalent) of polyoxypropylene triol (Mw/Mn=1.38, viscosity: 89 P) having a molecular weight of 15,000, and the reactor was purged with nitrogen gas.

Subsequently, 19.1 g (0.099 equivalent) of a 28% methanol solution of sodium methoxide from a dropping funnel was added dropwise thereto at 137° C. After the mixture was reacted for 5 hours, deaeration was carried out under reduced pressure. The reactor was again purged with nitrogen gas, and 9.0 g (0.118 equivalent) of allyl chloride was added dropwise thereto. After the mixture was reacted for 1.5 hours, 5.6 g (0.029 equivalent) of a 28% methanol solution of sodium methoxide and 2.7 g (0.035 equivalent) of allyl chloride were further added thereto to thereby carry out allylation.

The resulting reaction mixture was dissolved in hexane and subjected to an adsorption treatment with aluminum silicate. Hexane was then removed under reduced pressure to obtain 311 g of a yellowish transparent polymer (viscosity: 68 P).

Into a pressure glass reactor was charged 270 g (0.065 equivalent) of the polymer, and the reactor was purged with nitrogen gas. Subsequently, 0.075 ml of a solution of chloroplatinic acid catalyst (a solution of 25 g of $H_2PtCl_6.6H_2O$ dissolved in 500 g of isopropyl alcohol) was added thereto, and the mixture was stirred for 30 minutes. To the mixture, there was added 6.24 g (0.059 equivalent) of dimethoxymethyl silane from a dropping funnel, and the mixture was reacted at 90° C. for 4 hours. Deaeration was then carried out to thereby obtain 260 g of a yellowish transparent polymer B (Mw/Mn=1.5, viscosity: 88 P).

SYNTHESIS EXAMPLE 2

Into a 1.5 l pressure glass rector was charged 330 g (0.067 equivalent) of polyoxypropylene glycol (Mw/Mn=1.16, viscosity: 48 P) having a molecular weight of 9,000, and the reactor was charged with nitrogen gas.

Subsequently, 14.1 g (0.073 equivalent) of a 28% methanol solution of sodium methoxide from a dropping funnel was added dropwise thereto. After the mixture was reacted for 5 hours, deaeration was carried out under reduced pressure. The reactor was again purged with nitrogen gas, and 6.7 g (0.087 equivalent) of allyl chloride was added dropwise thereto. After the mixture was reacted for 1.5 hours, 4.0 g (0.021 equivalent) of a 28% methanol solution of sodium methoxide and 1.9 g (0.025 equivalent) of allyl chloride were further added thereto to thereby carry out allylation.

The reaction mixture was dissolved in hexane and subjected to an adsorption treatment with aluminum silicate. Hexane was then removed under reduced pressure to thereby obtain 290 g of a yellowish transparent polymer (viscosity: 38 P).

Into a pressure glass reactor was charged 210 g (0.040 equivalent) of the polymer, and the reactor was purged with nitrogen gas. Subsequently, 0.046 ml of a solution of chloroplatinic acid catalyst (a solution of 25 g of $H_2PtCl_6 \cdot 6H_2O$ dissolved in 500 g of isopropyl alcohol) was added thereto, and the mixture was stirred for 30 minutes. To the mixture, there was added 6.0 g (0.057 equivalent) of dimethoxymethylsilane from a dropping funnel. After the mixture was reacted at 90° C. for 4 hours, deaeration was carried out to thereby obtain 200 g of a yellowish transparent polymer A (Mw/Mn=1.3, viscosity: 54 P).

EXAMPLES 1 TO 3

The polymer B obtained in Synthesis Example 1 was mixed with the polymer A obtained in Synthesis Example 2 in a ratio given in Table 1. To 100 parts of the mixture, there were added 120 parts of calcium carbonate (CCR manufactured by Shiraishi Kogyo KK), 20 parts of titanium dioxide (rutile type titanium oxide R-820 manufactured by Ishihara Sangyo Kaisha Ltd.), 2 parts of vinyltrimethoxysilane, 3 parts of aminosilane compound (A-1120 manufactured by Nippon Unicar Co., Ltd.), 2 parts of thixotropic agent (D-6500 manufactured by Kusumoto Kasei KK), 2 parts of curing accelerator (Neostann U-220 manufactured by Nitto Kasei Co., Ltd.) and 2 parts of antioxidant. The mixture was kneaded. Type 1 H type sample according to JIS A 5758 and a cured sheet sample of 3 mm in thickness were prepared. A dumbbell specimen (JIS A type) for tear test was prepared from the cured sheet sample.

COMPARATIVE EXAMPLES 1 AND 2

The same additives as those described above were added to 100 parts of the polymer B obtained in Synthesis Example 1 or 100 parts of the polymer A obtained in Synthesis Example 2. The mixture was kneaded. Type 1 H type sample according to JIS A 5758 and a cured sheet sample of 3 mm in thickness were prepared. A dumbbell specimen (JIS A type) for tear test was prepared from the cured sheet sample (the polymer B was used in Comparative Example 1, and the polymer A was used in Comparative Example 2).

A tear test was made by using each of the dumbbell specimens prepared in Examples 1 to 3 and Comparative Examples 1 and 2 and a tear strength was measured. The results are shown in Table 1.

Further, a tensile test was made by using each of H type samples prepared in Examples 1 to 3 and Comparative Examples 1 and 2. Modulus at 50% (M50), tensile strength at break (TB) and tensile elongation at break (EB) were measured. The results are shown in Table 1.

TABLE 1

| | Component B (parts) | Component A (parts) | Tear strength (kg/cm) | M50 (kg/cm$^2$) | TB (kg/cm$^2$) | EB (%) |
|---|---|---|---|---|---|---|
| Example 1 | 30 | 70 | 12.2 | 3.1 | 7.1 | 280 |
| Example 2 | 50 | 50 | 11.8 | 3.6 | 6.8 | 250 |
| Example 3 | 70 | 30 | 11.2 | 4.0 | 6.6 | 220 |
| Comp. Ex. 1 | 100 | 0 | 9.2 | 4.3 | 5.7 | 150 |
| Comp. Ex. 2 | 0 | 100 | 10.8 | 2.8 | 7.2 | 300 |

It can be seen from Table 1 that each of the articles prepared in Examples 1 to 3 has a high tear strength in comparison with the tear strength of Comparative Example 1 or 2.

While the present invention has been described in detail and with reference to specific embodiments thereof, it is apparent to one skilled in the art that various changes and modifications can be made therein without departing from the spirit and the scope of the present invention.

What is claimed is:

1. A curable composition comprising:
   (A) an oxypropylene polymer:
   (1) which has a ratio of Mw/Mn of not higher than 1.6;
   (2) which has a polymer main chain consisting essentially of a repeating unit represented by the following formula;

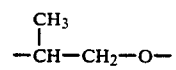

$$-\underset{\underset{\text{CH}_3}{|}}{\text{CH}}-\text{CH}_2-\text{O}-$$

(3) which does not have any branched chain other than methyl groups of said repeating unit; and
   (4) which has at least one silicon atom-containing group having one or more silicon atoms to which one or more hydrolyzable groups are attached; and
   (B) an oxypropylene polymer:
   (1) which has a ratio of Mw/Mn of not higher than 1.6;
   (2) which as a polymer main chain consisting essentially of a repeating unit represented by the following formula;

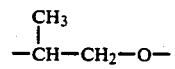

$$-\underset{\underset{\text{CH}_3}{|}}{\text{CH}}-\text{CH}_2-\text{O}-$$

(3) which as at least one branched chain consisting essentially of a repeating unit represented by the above formula;
   (4) which as at least one silicon atom-containing group having one or more silicon atoms to which one or more hydrolyzable groups are attached.

2. A curable composition as claimed in claim 1, wherein said silicon atom-containing group having one or more silicon atoms to which one or more hydroxyl groups or hydrolyzable groups are attached is a group represented by the following general formula

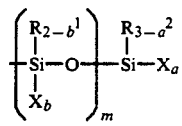

wherein $R^1$ and $R^2$ each represents an alkyl group having 1 to 20 carbon atoms, an aryl group having 6 to 20 carbon atoms, an aralkyl group having 7 to 20 carbon atoms or a triorganosiloxy group of $(R')_3SiO-$ provided that when two or more $R^1$ or $R^2$ groups exist, two or more $R^1$ or $R^2$ groups may be the same or different; $R'$ represents a monovalent hydrocarbon group having 1 to 20 carbon atoms provided that three $R'$ groups may be the same or different; X is a material selected from the group consisting of a hydroxyl group and a hydrolyzable group provided that, when two or more X groups exist, these X groups may be the same or different; a represents 0, 1, 2 or 3; b represents 0, 1 or 2; when two or more groups represented by the following formula

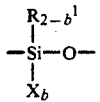

exist, b in the above formula may be the same or different; and m represents an integer of 0 to 19 provided that the following relationship must be satisfied.

$$a + \Sigma b \geqq 1$$

3. A curable composition as claimed in claim 1, wherein said silicon atom-containing group is a group represented by the following general formula

wherein $R^2$ represents an alkyl group having 1 to 20 carbon atoms, an aryl group having 6 to 20 carbon atoms, an aralkyl group having 7 to 20 carbon atoms or a triorganosiloxy group of $(R')_3SiO-$; $R'$ represents a monovalent hydrocarbon group having 1 to 20 carbon atoms provided that three $R'$ groups may be the same or different; X is a material selected from the group consisting of a hydroxyl group and a hydrolyzable group provided that when two or more X groups exist, these X groups may be the same or different; and a represents 0, 1, 2 or 3.

4. A curable composition as claimed in claim 1, wherein said oxypropylene polymers (A) and (B) have a ratio of Mw/Mn of not higher than 1.5.

5. A curable composition as claimed in claim 1, wherein said oxypropylene polymer (B) is a polymer having one branched chain.

6. A curable composition as claimed in claim 1, further comprising a curing catalyst in an amount from about 0.1 to about 20 parts by weight of the composition.

7. A curable composition as claimed in claim 1, further comprising, per 100 parts by total weight of the oxypropylene polymers (A) and (B), about 5 to 20 parts of a filler, and from about 1 to about 100 parts of a plasticizer.

8. A curable composition as claimed in claim 1, wherein said oxypropylene polymers (A) and (B) have a number-average molecular weight (Mn) of not less than 4,000.

9. A curable composition as claimed in claim 1, wherein the mixing ratio, on a parts by weight basis, of said oxypropylene polymer (A) to said oxypropylene polymer (B) is from 10:90 to 90:10.

* * * * *